United States Patent

[11] 3,630,126

[72] Inventor  Ernest Winston Ronai
              56 Linden Way, Castlecrog, New South Wales 2068, Australia
[21] Appl. No. 850,767
[22] Filed     Aug. 18, 1969
[45] Patented  Dec. 28, 1971

[54] APPARATUS FOR CUTTING TUBES
     15 Claims, 8 Drawing Figs.
[52] U.S. Cl. ................................................. 93/80,
     82/47, 82/82, 83/54, 83/340, 83/672, 93/77 CL, 93/94 R
[51] Int. Cl. ....................................................... B31c 3/00,
     B31c 11/00, B23b 5/14
[50] Field of Search ............................................. 93/77, 80,
     94; 82/47, 70.1–72, 82; 83/37, 54, 340, 672

[56]              References Cited
              UNITED STATES PATENTS
| 3,550,246 | 12/1970 | Zoller | 83/340 X |
| 1,577,619 | 3/1926 | Gammeter | 83/672 X |
| 1,747,270 | 2/1930 | Von Reis | 83/340 X |
| 2,326,978 | 8/1943 | Sieg | 82/53.1 X |
| 2,623,443 | 12/1952 | Robinson | 93/80 |
| 2,623,445 | 12/1952 | Robinson | 93/94 |
| 3,095,774 | 7/1963 | Hart | 83/37 |
| 3,133,483 | 5/1964 | Glasby | 93/80 |
| 3,150,574 | 9/1964 | Glasby | 93/80 |
| 3,254,549 | 6/1966 | Ronai | 82/53.1 |
| 3,504,717 | 4/1970 | Pittman | 83/340 X |
| 3,504,718 | 4/1970 | Pittman | 83/340 X |

*Primary Examiner*—Wayne A. Morse, Jr.
*Attorney*—John W. Adams

ABSTRACT: Method and apparatus for cutting continuous tubing which has been helically wound from a strip or strips of sheet material into tubular sections of uniform length by means of a rotary helical cutter which is periodically applied to the tubing, the point of cutter contact moving longitudinally along the cutting mandrel at the same speed as the tubing and the helical cutter blade being maintained at the point of contact at an angle perpendicular to the axis of the tubing being cut, to produce a cut around the complete circumference of the tubing at right angles to the tubing axis and form tube unit of a predetermined length.

INVENTOR
ERNEST WINSTON RONAI
BY
John W. Adams
ATTORNEY

INVENTOR
ERNEST WINSTON RONAI

BY
John W. Adams
ATTORNEY

APPARATUS FOR CUTTING TUBES

This invention has reference to a method and means for cutting into tubular sections of uniform length, continuous tubing which has been helically wound from a strip or strips of sheet material.

Such tubular sections are frequently used to provide the body wall structure of containers for various products, of cylindrical carriers for sheet material to be wound thereon, or of wound cylindrical bodies for other uses.

The outer layer of the continuous tubing so formed frequently contains a repetitive pattern which requires precise registration when the tubing is cut into such tubular sections. This presupposes a precise positioning of the cut relative to the printed pattern applied to the tubing in order to obtain accurately the identical pattern on each of the cut sections of tubing.

In the past a number of different methods and means for cutting such tubular sections have been used. Among the known means there is the reciprocating flying cutter or gang of cutters, as well as a continuous endless cutter conveyor such as is described in Australian Pat. No. 251,673. Although these methods and means have proved to be reasonably successful in practice, the instant invention provides an improvement over both the known methods and the known means.

The principal object of this invention is to provide an improved method and means for the purpose set forth by which a more even and cleaner cut is ensured with reduced wear on cutters and mandrel, which will require less power than the means previously known, which permits easier control for ensuring that, by the operation of the cutter, surface patterns are obtained on the individual tube sections which are precisely uniform and, furthermore, means which can be quickly adjusted to compensate for variations, if any, in the angular or other relationship of the strip or strips being wound.

The method and means according to the invention, are also of advantage where no pattern is applied to the tube sections, but importance is attached to produce tube sections of identical length at higher rates of speed.

The salient feature of the improved method and means lies in that the cutting of the tubing produced by helically winding a strip or strips of sheet material on a mandrel, into sections of predetermined lengths, is effected by means of a rotary helical cutter which is periodically applied to the tubing on a support for same, and withdrawn therefrom. The rotation of the helical cutter may for instance be effected by the rotation of the tubing itself in which case the cutter is frictionally engaged and driven by the tubing being cut. Alternatively, the cutter also may be positively driven, in synchronism with the tubing.

The conditions which must be maintained for the successful operation of this invention are the following.

1. The point of cutting contact between the helical cutter and the mandrel which carries the tubing must move longitudinally along said mandrel at the same speed as the tubing which is being produced on the mandrel and is cut by the cutter.

2. The helical cutter is rotated at a circumferential speed being substantially that of the tubing.

3. There should be no angular acceleration or deceleration of the rotating cutter during the cutter and of operation, the circumferential speed of the cutter and of the tubing on the mandrel being substantially constant during the cutting operation.

4. The helical cutter blade must be maintained in a position in which it effects the cut perpendicularly to the axis of the tubing to be cut, so as to carry out at the cutting point at any instant a cut in a plane perpendicular to the tube axis, the end of each cut meeting the beginning of said cut on the tube at the conclusion of each cutting operation.

The invention complies with these conditions and meets the above requirements in every respect. For achieving the object of the invention the cutting mechanism includes a mandrel which may be the mandrel of a tube-winding machine or an extension of said mandrel, the mandrel of the cutting mechanism having a free end portion which preferably should be rotatable and driven, the mandrel acting as a cutting support. The tubing may be formed on the mandrel by conventional winding means and the support —e.g. a cylinder — which carries the helical cutter is mounted for reciprocation along a track in a plane which is parallel to a plane containing the mandrel axis, the cylinder axis making a variable angle with a geometric projection of the mandrel axis onto said first mentioned plane, the angle being selected to ensure that, at the cutting point, the helical cutter will at all times operate in a plane perpendicular to the mandrel axis.

The helical cutter blade must be maintained in contact with the mandrel surface so that the point of tangency between the cutter and the mandrel will determine the position of a straight line which intersects at right angles the axes of both the mandrel and the cutter.

In one specific embodiment of the invention, as described hereafter, the cutter cylinder is reciprocated along its track by any suitable means such as a rotary cam or cams designed specifically to produce a motion of said cylinder along said track towards the cutting station, and away from said station after the cut has been completed. During the cutting operation the cutting point of the helical blade is displaced relative to the mandrel axis at a speed identical with that of the progress of the tubing on the mandrel. This is ensured by the fact that the rotation of the cutter and of the cylinder carrying same is effected by frictional contact of the cutter blade with the tubing and the mandrel. The portion of the mandrel which acts as a cutting support is preferably rotated to reduce frictional resistance between the cutter blade and the mandrel surface.

In another embodiment of the invention it is possible to obtain the results set forth above by positively rotating the cylinder which carries the cutter blade, at a speed synchronized with that of the tubing produced, by means other than frictional engagement with that tubing. The progress of the cutting point is determined by the progress of said cylinder along its track so that the progress of said cylinder must be accurately synchronized with that of the tube to be cut on the mandrel. This can be achieved by effecting the progress of both the tube being formed on the mandrel and of the cutter cylinder along its track by a common drive which may include a DC motor, in conjunction with photoelectric control means acting on said drive, the photoelectric means being themselves actuated, e.g., by printed signals or by other marks on he material forming the tube, e.g. paper or board.

The cutter blade must be at least long enough to but through the tubing around the entire circumference thereof and, when the cut has been completed, the blade must be returned to its starting position. Accordingly, means are associated with the cutter cylinder for returning same to its starting point on the track for its reciprocation, and further mechanism, e.g. a spring, or springs be provided for turning the helical cutter back to its starting point.

The cutter cylinder may be arranged for reciprocation in a horizontal plane by means of a slide. Some means must be provided on the apparatus for moving the cutter cylinder in a direction generally perpendicular to its axis during the cutting operation, in order to maintain contact between the cutter and the tubing to be cut permanently on the tangent determined by the cutting point as it travels along the mandrel.

Further means are provided for adjusting the angle the axis of the cutting cylinder makes with the axis of the mandrel to compensate for slight variations, if any, in the thickness of the material or materials wound, and/or in the winding operation.

In order to maintain the right-angular relationship of the axis of the cutter cylinder to its direction of movement towards the cutting position, in the event of such angular variation of the cutter cylinder, the direction of the movement of the slide carrying the cylinder must be adjusted accordingly. This angular adjustment, however, can only be effected around the pivotal axis which intersects the mandrel axis, on the one hand, and the cylinder axis in the middle of the latter on the other hand.

Moreover provision may be made, e.g. of a helical ball race, to allow the blade to "float" to compensate for differences of the cutter diameter and for slight variations in the speed of the tubing to be cut while the cutter is in cutting engagement.

Suitable control means, e.g. photoelectric cells, must be provided to ensure a properly registered starting position of the helical cutter blade at the beginning of each cutting operation.

More than one cutter may be used on the cutter cylinder, the operation of which may be facilitated by an increase of the diameter of the cutter cylinder and, consequently, a change of the pitch of the cutter blade depending on the number of said blades, since the helical angle is independent of the dimensions of the cutter cylinder.

The use of a cutter cylinder with a number of cutter blades thereon will also increase the life of the cutter, both by distributing wear over the cutter blades and by increasing the permissible grind-down for a given variation of the helix angle.

If tube sections shorter than the pitch of the tube windings are to be cut, two or more cutter cylinders mutually staggered in relation to the mandrel must be arranged around the mandrel to permit a blade on another cutter cylinder to reach the cutting position when the first cutter ceases to operate. Such an arrangement would also serve to maintain a substantially constant resistance of the tubing being formed, and may enable the simultaneous cutting of two or more cans.

Continuous cutting of tube sections would be permitted by providing two slides located on opposite sides of the mandrel with cutting cylinders mounted thereon, with one cylinder cutting while the other is being moved back into position. This, of course, is possible only if the return can be accomplished within the time required for the cutting of each tube section.

In order to more particularly describe the invention, reference is made to the accompanying drawings which illustrate, by way of example only, a tube-winding machine and two different embodiments of the cutting means according to the invention for use on said winding machine. In these drawings:

FIG. 4A is a section taken on line IVA—IVA of FIG. 4.

Figure 5:
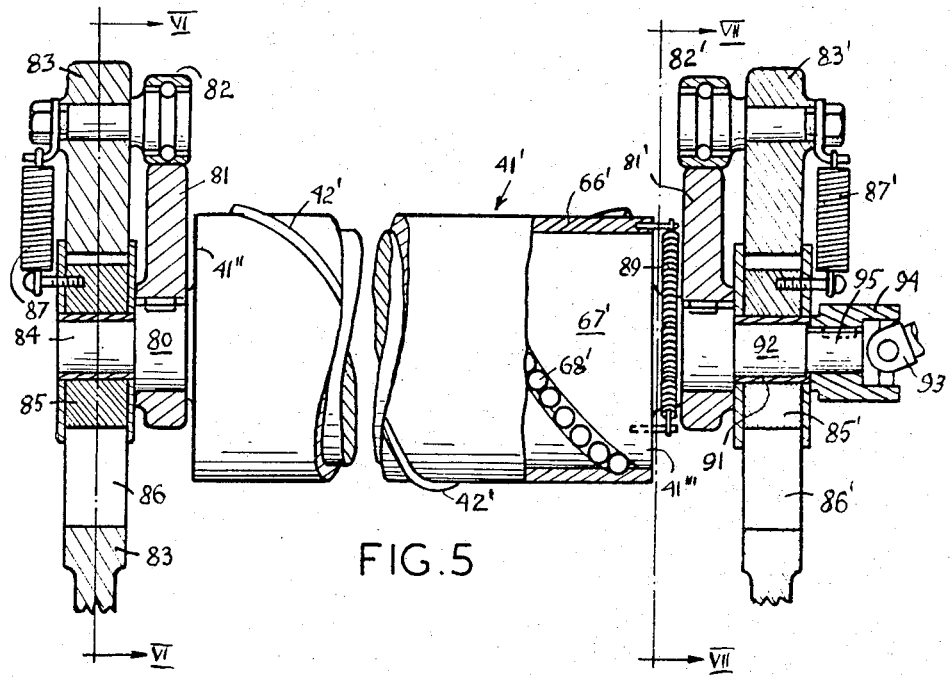
Figure 6:
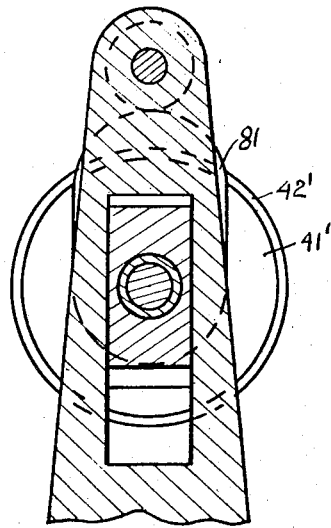
Figure 7:
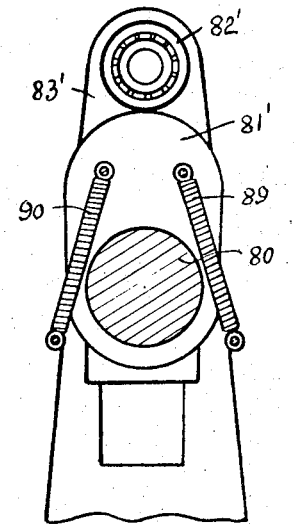

FIGS. 5, 6, and 7 are, respectively, an elevational view partly in section, and sectional views on lines VI—VI and VII—VII, respectively, showing a modified form of the cutter mechanism according to the invention.

Figure 1:
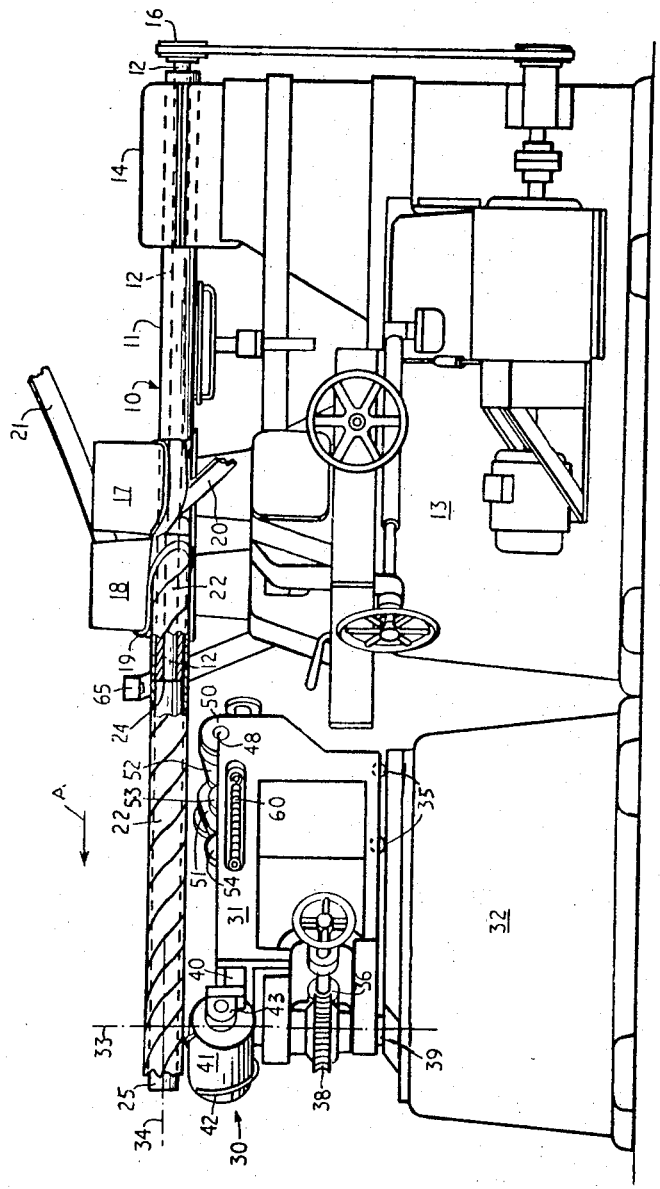
FIG. 1 is an elevational view showing a winding machine together with one specific embodiment of the cutting mechanism according to the invention applied thereto.

A tube-winding machine of conventional type is illustrated in the right-hand half of FIG. 1. The figure shows the horizontal mandrel 10 which consists of an outer tubular portion 11 which encloses a solid shaft 12. The tubular portion 11 of the mandrel, which is comparatively strong, is rigidly held in a position above the bed 13 of the machine by a clamping support 14. The shaft 12 is driven from a motor, preferably a DC motor 15, via transmission gearing (not shown) and, e.g. via a pulley 16 secured to the shaft end which projects from the clamping support 14. The tube-winding mechanism may, for instance, comprise two upright, rotating drums 17 and 18 arranged at the opposite sides of the mandrel. The drums 17, 18 carry, in a manner known per se, a belt 19 of suitable belting material wound about the mandrel 10 in such a manner that it effects the winding of paper or like strip material fed under the belt from one or more than one source of supply. In FIG. 1 two such strips 20 and 21 are shown which are supplied to the winding machine, e.g., from reels (not shown).

On leaving the winding mechanism, the strips form a helically wound tube 22 which by the operation of the belt 19 is made to progress along the mandrel 10 in the direction of the arrow A. The outer tubular portion 11 of the mandrel 10 terminates at a location 24 near the mandrel section on which the tube is being wound. The shaft portion which projects from the stationary tubular portion 11 has an outer diameter which is increased to equal substantially that of the tubular portion 11 so that the tubing 22 is formed on the mandrel is adequately supported by the rotated shaft portion 25 during its progress towards the cutting device 30 which adjoins the tube-winding machine, as shown in he left-hand half of FIG. 1.

Figure 2:
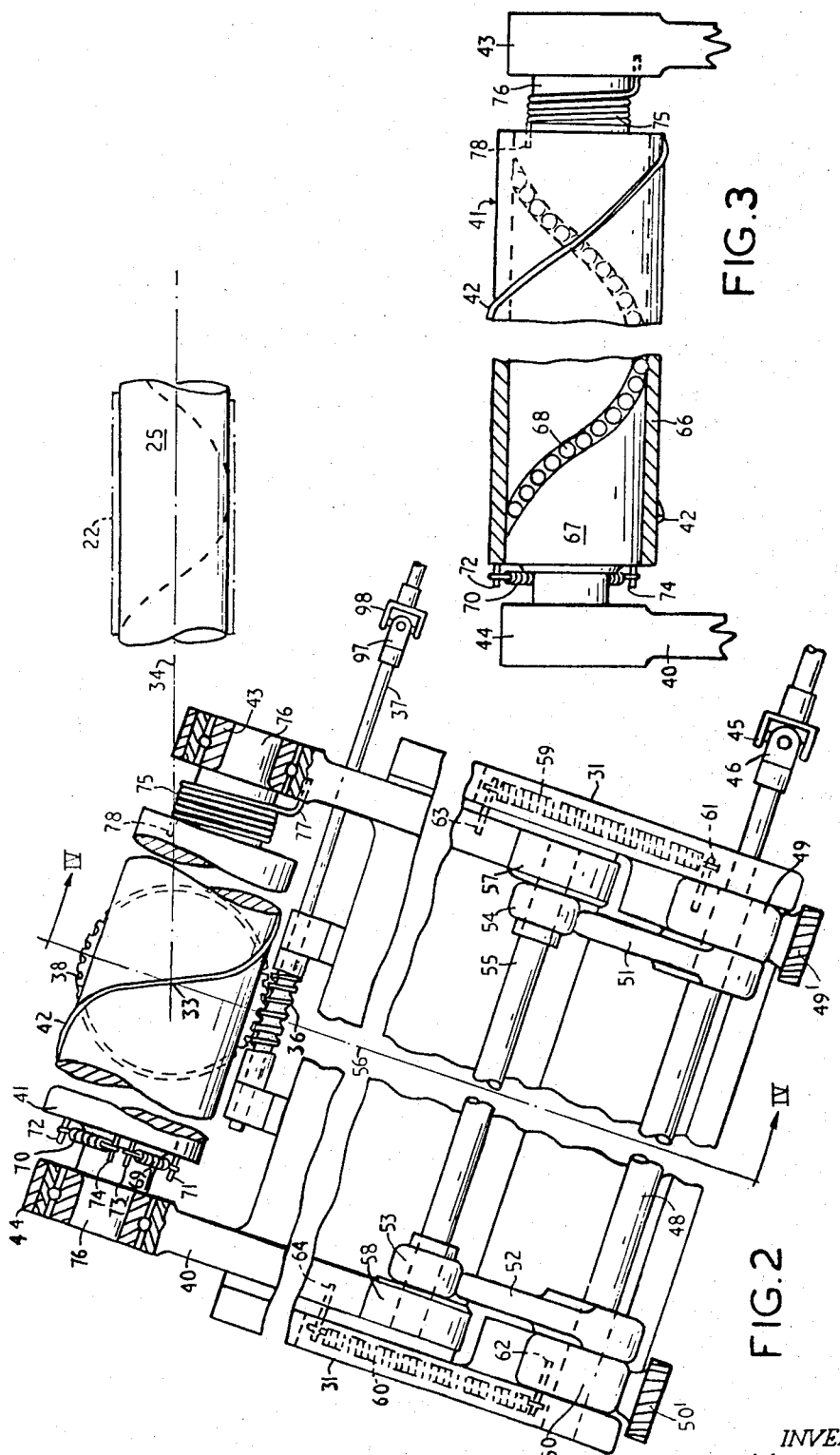
FIG. 2 is a plan view on a larger scale showing the cutting mechanism of FIG. 1 in relation to the portion of the mandrel of the winding machine which supports the tubing formed thereon during the cutting operation.
Figure 3:
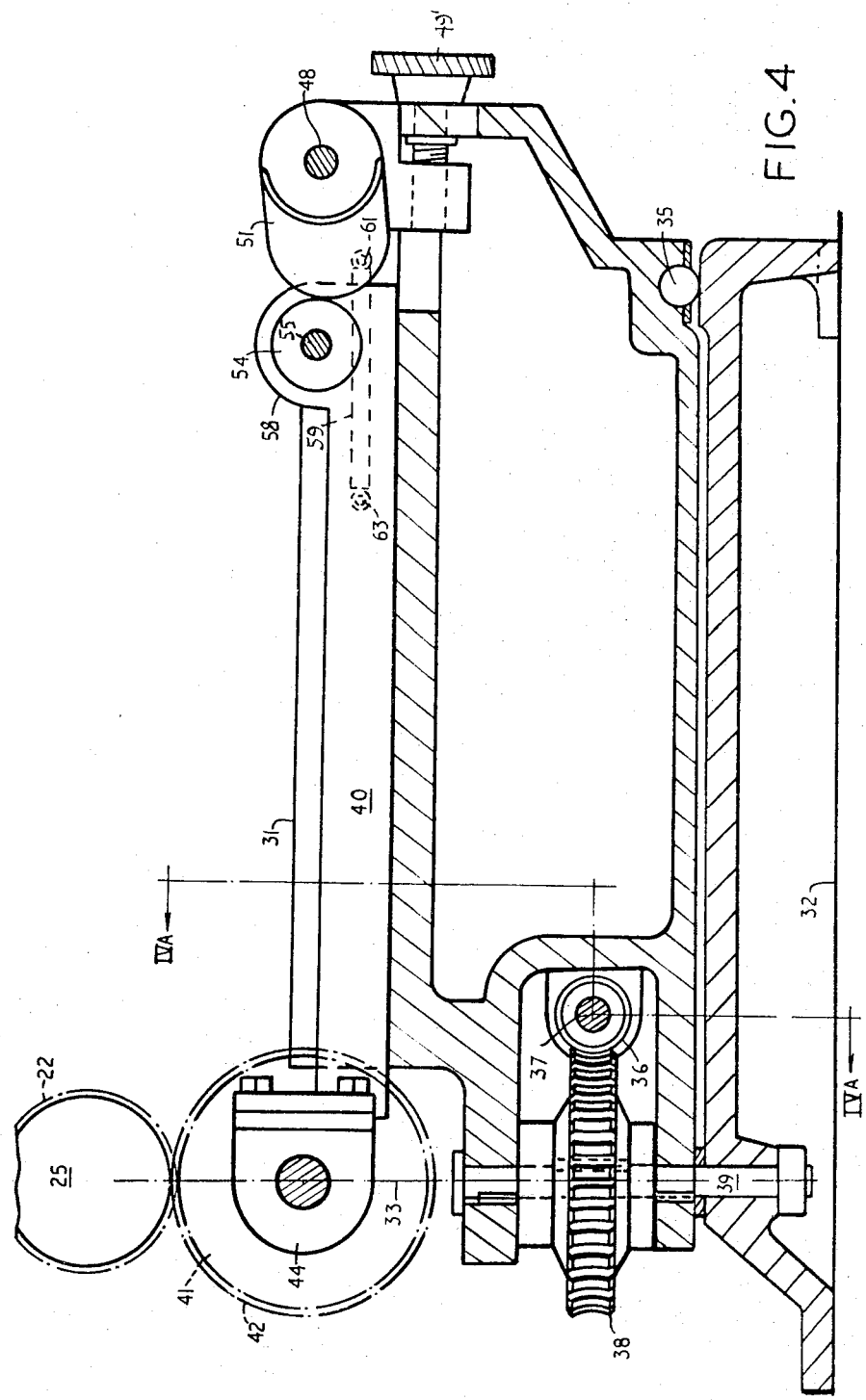
FIG. 3 is a view, partly in section, of the cutter cylinder in the device shown in FIG. 2.
Figure 4:
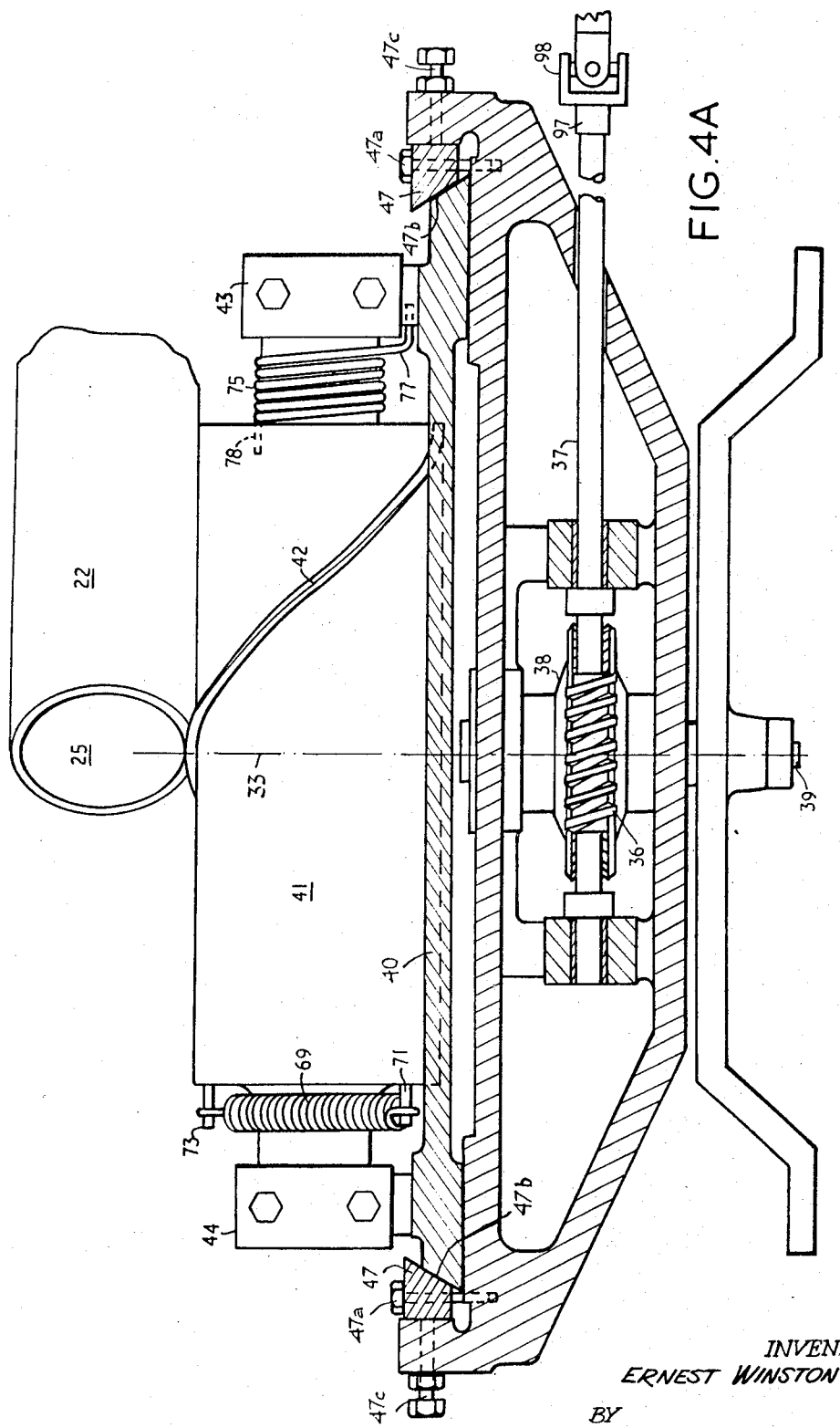
FIG. 4 is a vertical sectional view taken on line IV—IV of FIG. 2.

The cutting device 30 which is shown in more detail in FIGS. 2 to 6 of the drawings comprises a guide frame 31 on a base 32, the frame 31 being rotatably adjustable about a vertical axis 33 which intersects the axis 34 of the mandrel 10, as can be seen most clearly from FIG. 2, the frame being supported on the base 32, e.g. by balls 35 or rollers which permit the position of the frame 31 to be angularly adjusted on the base 32. FIGS. 2, 4 and 4A show, for instance, a worm gear including a worm 36 on a horizontal shaft 37 the worm meshing with a worm wheel 38 on a vertical shaft 39 the axis of which must coincide with the vertical axis 33 of angular adjustment.

At its free end the shaft 37 carries one part 97 of a universal point 97,98 the other part 98 of which is connected to a drive (not shown). The worm gear 36,38 is operated from said drive to adjust the angle between the longitudinal axes of the mandrel 10 and of the cutter support 41, to ensure that the cut produced by the cutter blade 42 remains permanently in a plane perpendicular to the mandrel axis. An adjustment of that angle may be effected automatically with the aid of a photoelectric cell 65 which actuates means (not shown) for the compensation of any variations which may occur during the winding operation.

The frame 31 acts as a guide for a slide 40 which carries the support for the cutter blade. In the form shown this support is constituted by a cutter cylinder 41 from the cylindrical surface of which projects the helical cutter blade 42. The cutter cylinder is rotatably supported on the slide 40 by two antifriction bearings, e.g. ball bearings 43 and 44 in mutual alignment. The adjustment of the position of the cutter cylinder 41 with the helical cutter blade 42 relative to the helically wound tube 22 to be cut into sections of equal length on the mandrel 10 for the purpose of moving the blade 42 into and out of engagement with the tube 22 to be cut is effected by a cam drive. This cam drive comprises a shaft 48 supported on the guide frame 31 by bearings 49 and 50, the cam shaft 48 carrying two mutually spaced and equally oriented cams 51 and 52 of identical shape and size, the cams being adapted, respectively, for operative engagement with two mutually spaced cam followers 53 and 54 on a spindle 55 supported by bearing 57 and 58 on the opposite sides of the slide 40. Coil springs 59 and 60 which extend along the opposite sides of the frame 31, have each one end thereof attached to a lug 61 and 62, respectively, which projects from the respective side of the frame 31, and another lug 63 and 64 which projects, respectively, from the opposite sides of the slide 40. The lugs 61 and 62 on the guide frame 31 and the lugs 63, 64 on the slide 40 are arranged, respectively, in mutual alignment relative to the longitudinal axis 56 which is common to the frame 31 and the slide 40. A fine adjustment of the position of the guide frame 31 can be effected by setscrews 49' and 50' respectively.

Adjustment of the cutting point of the cutter blade 42 so as to coincide at all times with the vertical axis 33, can be effected, whenever required, by the vertical adjustment of gibs 47 (FIG. 4A) by means of adjustment screws 47a relative to the bevelled edges 47b at the opposite sides of the slide 40. Fixation screws 47c serve for securing the gibs 47 in their adjusted positions.

The cutter cylinder 41 shown in FIG. 3 comprises an outer cylindrical shell 66 which is rotatable with clearance around a cylindrical core 67. A helical ball race 68 may be provided between the shell 66 and the cylindrical core 67, the pitch of the ball race 68 corresponding to that of the cutter blade on the shell 66 of the cutter cylinder 41. This arrangement permits the spontaneous and automatic, axial displacement of the cutter blade carried by the shell 66 relative to the core 67 of the cutter in response to such inaccuracies in the winding operation as may have to be compensated for in accordance with the invention. The return of the shell 66 so displaced relative to the core 67 to its normal position relative to the latter is effected automatically, on return of normal winding conditions by two coiled compensation springs 69 and 70 each being attached to the shell 66 and to the core 67 by means of lugs 71, 72 and 73, 74, respectively.

The tubing 22 wound on the winding section of the machine is exposed to view near the location 24 of the mandrel 10 and it is in this section where irregularities, if any, in the winding of the tubing 22 can be observed. Therefore the photoelectric device 65 is arranged on the machine at or near the location 24, as best shown in FIG. 1, said device comprising a photoelectric cell by which variations in the tubing 22 are detected. In the event of such variations occurring the photoelectric device energizes means which influence the operation of the means which control the operation of the cutter cylinder 41, i.e. driving means (not shown) which through a universal joint 45, 46 and the above-mentioned universal joint 97, 98 operate, respectively, the cam shaft 48, and the shaft 37 which carries the worm 36 of the worm gear 36, 38.

The helical cutter blade 42 engages the tubing being produced and is rotated thereby. The blade 42 is designed to produce a cut completely around the circumference of the tubing to sever the same. For the next cut the blade must be returned to its starting position, i.e. it must be rotated in the opposite direction about its axis through the angle it has passed during the cutting operation. Such a return of the cutter 41 is effected by a coiled torsion spring 75 disposed about the spindle 76 which carries the cutter 41, one end 77 of the spring 75 being secured to the slide 40 whereas the opposite end 78 of that spring is secured to the cylindrical core 67 of the cylinder 41.

The cutter 42 is of course disengaged from the tubing during the return of the cylinder 41 to its starting position. The distance the tubing travels while the cutter is disengaged determines the length of the individual tube sections being cut. For each helical cutter element the minimum length of tube section that can be produced will obviously be limited by the length of time required to return the cutter cylinder to its starting position, this time interval being related to the speed at which the tubing is being produced. Continuous cutting of the tube sections could be accomplished by providing a pair of individually mounted cutter elements subjects to the return time required for each cutter cylinder.

FIGS. 5 to 7 illustrate another embodiment of the cutter mechanism which in this case includes a cutter 41' with a helical blade 42' on its outer surface. As in the above-described embodiment, the cutter cylinder 41' also includes an outer cylindrical shell 66' and an inner core 67', as well as a helical ball race 68' between the shell 66' and the outer surface of the core 67', the pitch of the ball race 68' corresponding to that of the cutter blade 42'. This arrangement permits an axial displacement of the cutter blade 42' on the shell 66' relative to the core 67' of the cutter cylinder in response to a controlling force exercised upon the cutter cylinder due to inaccuracies in the winding of the tubing 22 spotted by the above-mentioned photoelectric device 65. The arrangement illustrated in FIGS. 5 to 7, however, differs from that described in the first place in that the operation of the cutter mechanism is effected by a positive drive. For this purpose the core 67' of the drum is mounted on, or is made in one with, a cam shaft 80 which on its free end portion, near the end 41'' of the cutter 41', carries a cam 81 which cooperates with a roller 82 mounted on a frame member 83, the roller 82 acting as a cam follower. The end 84 of the cam shaft adjacent the cam 81 is journaled in a stone or equivalent element 85 which is slidably displaceable within a guide 86 formed in the frame member 83. A tension spring 87 attached to the stone 85 on the one hand, and to the frame member 83, on the other hand, ensures permanent operative engagement of the cam 81 with the follower roller 82.

Balancing springs 89, 90 which are connected, on the one hand, to the shell 66' and, on the other hand, to the core 67' of the cutter 41', are arranged near the opposite end 41''' of said cylinder. The second frame member 83' near the springs 89, 90 is also provided with a guide 86' for a stone 85' which in a suitable bushing 91 holds the parts 92 of the cam shaft 80. A tension spring 87' is provided between the stone 85' and the frame member 83' to ensure permanent operative engagement of the cam 81' with the follower roller 82'.

To ensure the best operation, the cam shaft 80 carries a second cam 81' near the frame member 83' and the latter a roller 82' acting as a cam follower. If, however, the construction is light, the second cam 81' and the cam follower 82' can be eliminated.

The positive drive of the cutter 41' is effected from a motor (not shown) via appropriate gearing (likewise not shown) and a universal joint 93, 94, the driven element 94 of the universal joint being secured to the end 95 of the shaft 80 following the shaft portion 92.

The drive of the shaft 80 and the cutter 81' is subjected to control by the photoelectric device 65 which, as in the first described embodiment, responds to variations in the thickness of the material to be wound into the tubing 22 and/or to irregularities in the winding operation.

I desire it to be understood that I do not wish protection by Letters Patent to be limited to the above described details as these are capable of modification in various ways within the scope and ambit of the appended claims.

What is claimed is:

1. For use with equipment for winding helically wound tubing from a plurality of elongated strips of material, apparatus for cutting such tubing into sections of predetermined uniform length as the tubing is produced by such equipment, said apparatus comprising:

a mandrel for supporting the tubing during the cutting operation as the tubing is continuously supplied from said winding equipment;

a movable carriage with means for supporting the same for back and forth reciprocation in spaced relation to said tube supporting mandrel;

a helical cutter blade rotatably mounted on said carriage for movement therewith and having a cutting edge defining a cylindrical surface disposed tangentially to said tube-supporting mandrel; and means for reciprocating said carriage on its supporting means to maintain the cutting portion of the blade in cutting contact with the tube along a straight line portion of said mandrel.

2. The apparatus as claimed in claim 1, wherein said mandrel has a rotatable cutting portion mounted for engagement with a portion of the helical cutter blade.

3. The apparatus as claimed in claim 2, wherein said rotatable cutting portion on the mandrel is power driven at substantially the same speed as the rotational speed of the tubing and of the cutter.

4. For use with equipment for winding helically wound tubing from a plurality of elongated strips of material, apparatus for cutting such tubing into sections of predetermined uniform length as it is produced by such equipment, said apparatus comprising:

a mandrel for supporting the tubing during the cutting operation as the tubing is continuously supplied from said winding equipment, a movable cutter carriage mounted for movement in a straight line path disposed at an acute angle to the axis of the mandrel, helical cutter means having portions disposed at an angle complimentary to said acute angle, carried by said carriage and having a cutting edge movable into cutting engagement with the tubing supported by said mandrel, said carriage and said cutting edge being constructed and arranged to maintain the cutting edge generally normal to the mandrel axis and moving in a straight line of cutting engagement with the surface of said mandrel at the straight line speed at which the tubing is being supplied from said winding equipment.

5. The structure set forth in claim 4 and power-driven means for moving said cutter carriage along its path during said cutter operation at a speed to maintain said cutting edge in cutting engagement with said tubing.

6. The apparatus claimed in claim 1, wherein said rotatably mounted helical cutter blade is driven by engagement with the tubing being formed on said mandrel.

7. The apparatus claimed in claim 6 and spring means for returning the cutter blade to its starting position on its axis of rotation.

8. The apparatus in claim 1 and means for driving said helical cutter blade at a speed to synchronize the rate of rectilinear travel of the blade along the mandrel with the axial rectilinear speed of the tubing being formed on the mandrel.

9. The apparatus claimed in claim 8 and control means for maintaining synchronization of the rectilinear speeds of the cutter blade and the tubing.

10. The apparatus claimed in claim 1 wherein the back-and-forth reciprocation of the carriage lies in a plane parallel to a plane through the longitudinal axis of the tubing and the axis of the back-and-forth reciprocation of the carriage making an acute angle with a geometric projection of the mandrel axis such that the cutting portion of the helical cutter will be maintained in a plane perpendicular to the mandrel axis.

11. The apparatus claimed in claim 1 and control means for synchronizing the initial engagement of the helical cutter blade with the pattern on the tubing to maintain registration of the cutting action with the tubing pattern.

12. The apparatus claimed in claim 11 wherein said control means includes a photoelectric sensing element and circuitry responsive thereto for actuating the carriage-reciprocating means.

13. The apparatus claimed in claim 1 wherein said carriage-supporting means constitutes a track and cam means for producing the back-and-forth reciprocation of the carriage on said track.

14. The apparatus claimed in claim 1 including means for adjusting the angle between the axis of reciprocation of the carriage and the axis of the mandrel.

15. The apparatus claimed in claim 1 and a blade-mounting core including a helical ball race for mounting said helical cutting blade in floating relation along the helix defined thereby.

* * * * *